(12) United States Patent
Choi et al.

(10) Patent No.: US 10,297,856 B2
(45) Date of Patent: May 21, 2019

(54) ANODE PLATE FOR LITHIUM SECONDARY BATTERY, AND LITHIUM SECONDARY BATTERY COMPRISING THE SAME

(71) Applicant: ILJIN ELECTRIC CO., LTD., Hwaseong (KR)

(72) Inventors: Young Pil Choi, Ansan (KR); Cheol Ho Park, Suwon (KR); Min Hyun Kim, Seoul (KR); Myeong Han Kim, Ansan (KR); Seon Kyong Kim, Seoul (KR)

(73) Assignee: ILJIN ELECTRIC CO., LTD., Hwaseong (KR)

( * ) Notice: Subject to any disclaimer, the term of this patent is extended or adjusted under 35 U.S.C. 154(b) by 0 days.

(21) Appl. No.: 15/541,470

(22) PCT Filed: Feb. 26, 2016

(86) PCT No.: PCT/KR2016/001954
§ 371 (c)(1),
(2) Date: Jul. 3, 2017

(87) PCT Pub. No.: WO2016/137285
PCT Pub. Date: Sep. 1, 2016

(65) Prior Publication Data
US 2017/0352911 A1    Dec. 7, 2017

(30) Foreign Application Priority Data
Feb. 26, 2015  (KR) .......................... 10-2015-0027448

(51) Int. Cl.
*H01M 4/133* (2010.01)
*H01M 4/134* (2010.01)
(Continued)

(52) U.S. Cl.
CPC ............ *H01M 10/052* (2013.01); *H01M 4/13* (2013.01); *H01M 4/133* (2013.01); *H01M 4/134* (2013.01);
(Continued)

(58) Field of Classification Search
CPC .................................. H01M 4/00; H01M 4/386
See application file for complete search history.

(56) References Cited

U.S. PATENT DOCUMENTS 9,722,243 B2 * 8/2017 Park ...................... H01M 4/386
2006/0040182 A1 * 2/2006 Kawakami .......... H01M 10/052
429/218.1
(Continued)

FOREIGN PATENT DOCUMENTS

KR    10-2005-0013841 A    2/2005
KR    10-2007-0027438 A    3/2007
(Continued)

OTHER PUBLICATIONS

Li, X. et al., Silicon/Graphite/Carbon Nanotubes Composite as Anode for Lithium Ion Battery, Int. J. Electrochem. Sci. 2015, vol. 10. No. 4, pp. 2802-2811 (E-pub: Feb. 24, 2015).
(Continued)

*Primary Examiner* — James Lee
(74) *Attorney, Agent, or Firm* — Patent Office of Dr. Chung Park

(57) ABSTRACT

The present disclosure is to provide a negative electrode for a lithium secondary battery having high negative electrode efficiency and excellent capacity retention, and a lithium secondary battery including the negative electrode. In one aspect, there is provided a negative electrode for a lithium secondary battery, wherein the electrode contains 3 to 9% by weight of a silicon-based negative-electrode active material having a following composition formula (1); and 87.5 to 95.5% by weight of a graphite-based negative-electrode active material:

(Continued)

$$Si_xTi_yFe_zAl_u \quad (1)$$

where x, y, z and u are atomic %, x: 1−(y+z+u), y: 0.09 to 0.14, z: 0.09 to 0.14, u: 0.01 exclusive to 0.2 exclusive.

13 Claims, 5 Drawing Sheets

(51) Int. Cl.
- *H01M 4/587* (2010.01)
- *H01M 10/052* (2010.01)
- *H01M 4/38* (2006.01)
- *H01M 4/62* (2006.01)
- *H01M 4/13* (2010.01)
- *H01M 4/36* (2006.01)

(52) U.S. Cl.
CPC ............ *H01M 4/364* (2013.01); *H01M 4/38* (2013.01); *H01M 4/386* (2013.01); *H01M 4/587* (2013.01); *H01M 4/62* (2013.01); *H01M 4/622* (2013.01); *H01M 4/625* (2013.01)

(56) References Cited

U.S. PATENT DOCUMENTS

| | | | |
|---|---|---|---|
| 2013/0177807 A1* | 7/2013 | Lee | H01M 4/621 |
| | | | 429/217 |
| 2015/0008374 A1* | 1/2015 | Kim | H01M 4/386 |
| | | | 252/503 |
| 2015/0140359 A1* | 5/2015 | Park | H01M 4/0471 |
| | | | 429/5 |
| 2016/0013484 A1* | 1/2016 | Seki | H01M 4/364 |
| | | | 429/231.8 |

FOREIGN PATENT DOCUMENTS

| KR | 10-2013-0054178 A | 5/2013 |
|---|---|---|
| KR | 10-2014-0165114 A | 6/2016 |
| KR | 10-2015-0001837 A | 7/2016 |

OTHER PUBLICATIONS

Lee. K.-M. et. al., Electrochemical Characterization of Ti—Si and Ti—Si—Al Alloy Anodes for Li-ion Batteries Produced by Mechanical ball milling, Journal of Alloys and Compounds, 2009, vol. 472. No. 1, pp. 461-465.

* cited by examiner

[FIG. 1A]
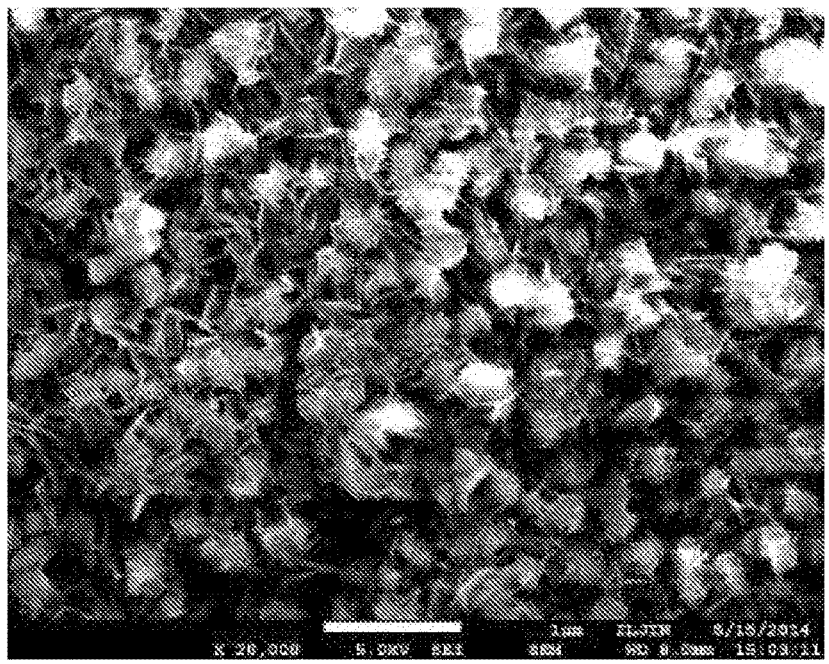
[FIG. 1B]
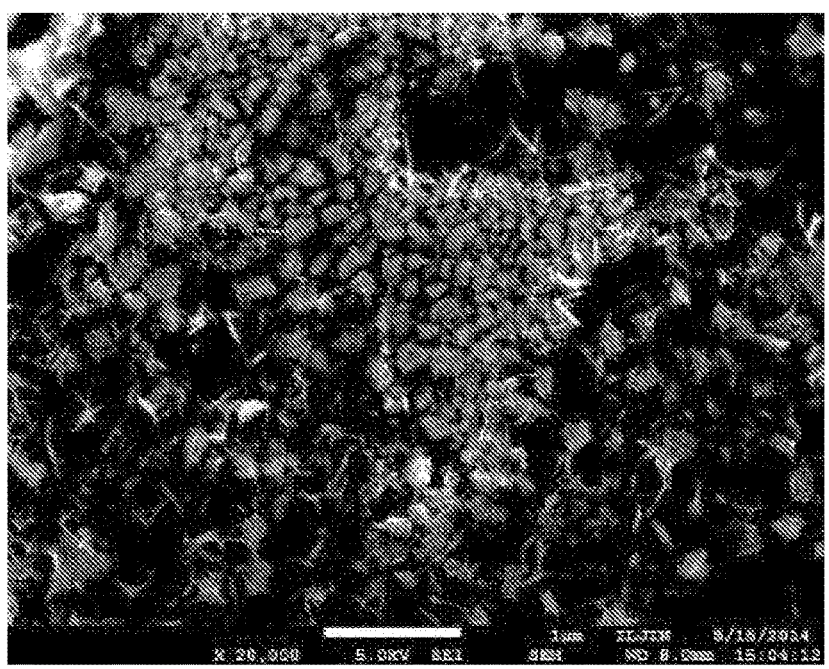

[FIG. 1C]
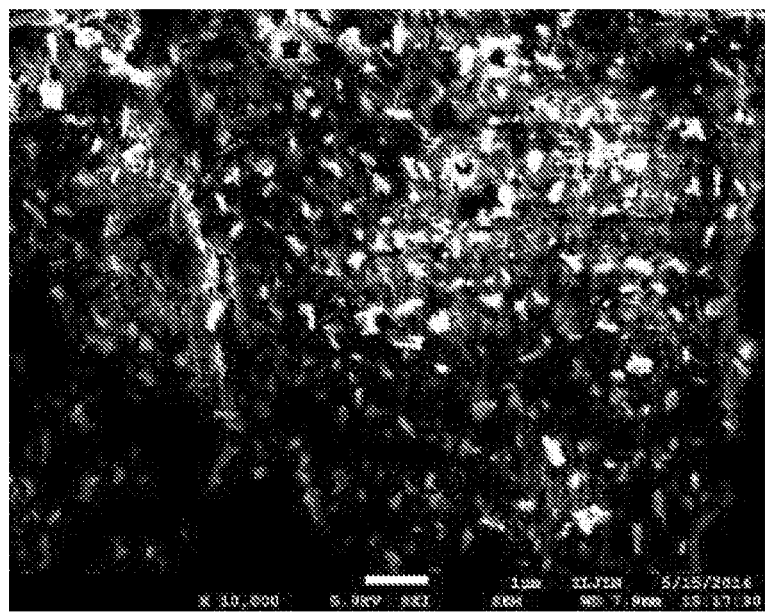
[FIG. 2]
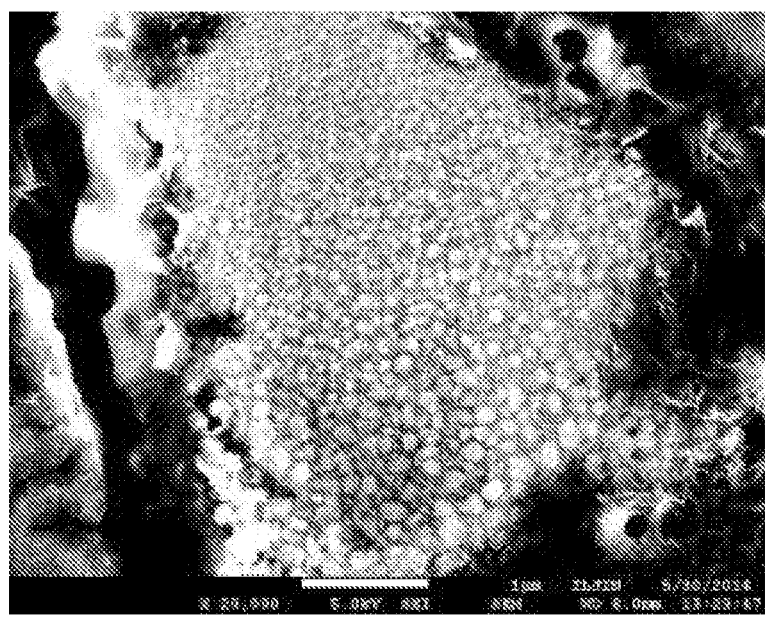

[FIG. 3]
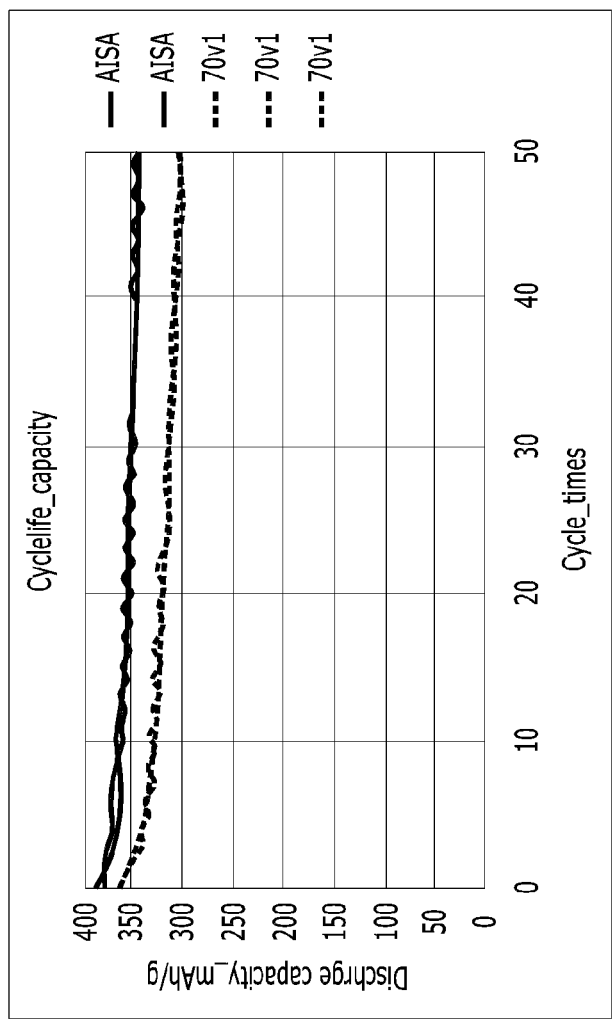
(AISA: with present silicon-based negative-electrode active material
70V1: with comparison metal-based negative-electrode active material)

[FIG. 4]
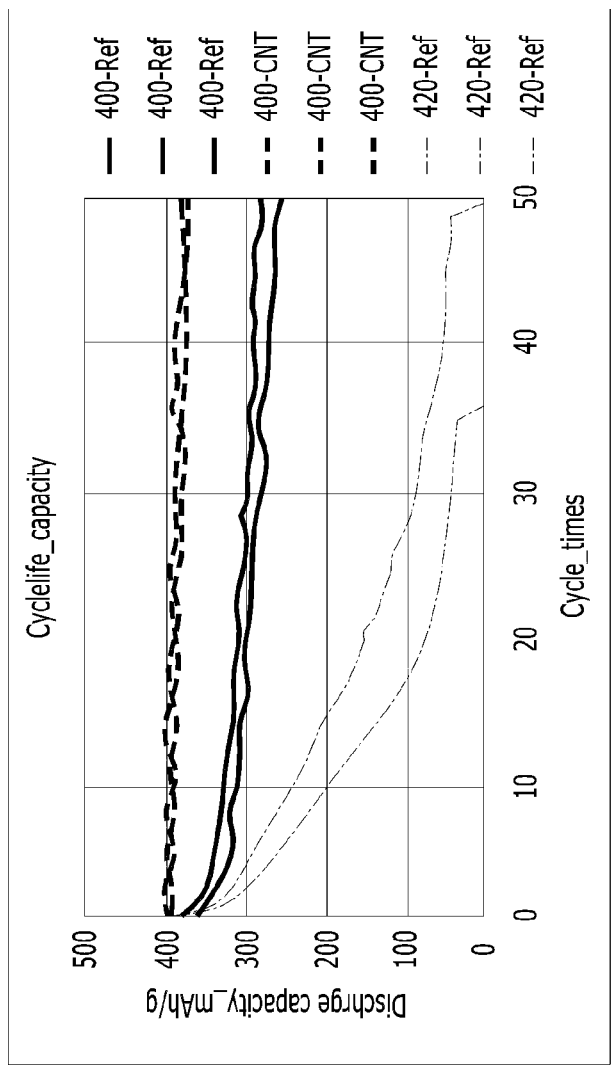
(400-ref: with present silicon-based negative-electrode active material at 5.8 wt%
400-cnt: with present silicon-based negative-electrode active material with CNT
420-ref: with present silicon-based negative-electrode active material at 9.6 wt%)

[FIG. 5A]
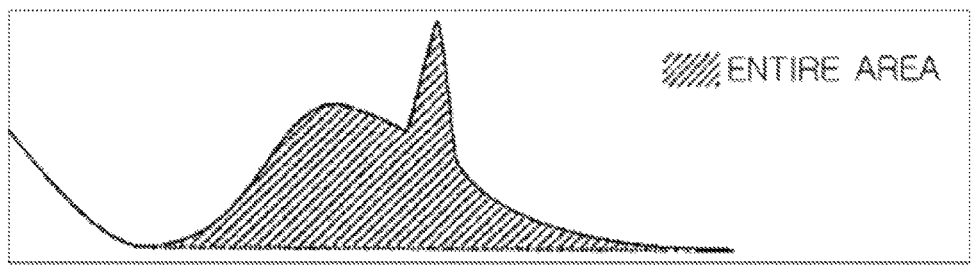
[FIG. 5B]
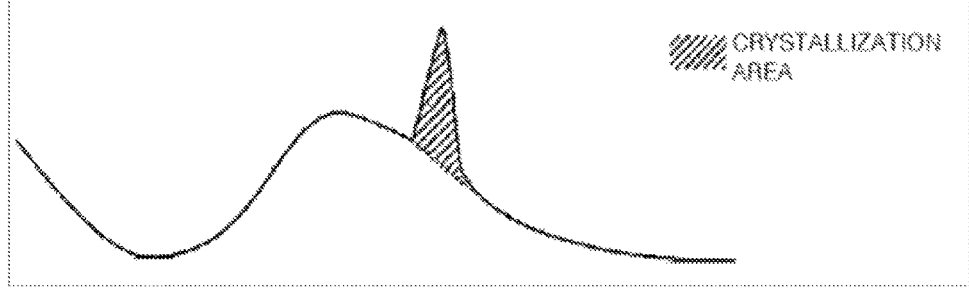

ANODE PLATE FOR LITHIUM SECONDARY BATTERY, AND LITHIUM SECONDARY BATTERY COMPRISING THE SAME

BACKGROUND

Field of the Present Disclosure

The present disclosure relates to a negative electrode for a lithium secondary battery, and more particularly, to a negative electrode for a lithium secondary battery having high negative electrode efficiency and excellent capacity retention, and a lithium secondary battery including the negative electrode.

Discussion of the Related Art

Conventionally, lithium metal is used as a negative-electrode active material of a lithium battery. When lithium metal is used, there is a risk of explosion resulting from short-circuiting of the battery due to the formation of dendrite. Thus, instead of lithium metal, a carbon-based material is used as a negative-electrode active material.

The carbon-based active material includes crystalline carbon, such as graphite and artificial graphite, and amorphous carbon, such as soft carbon and hard carbon. However, although the amorphous carbon has a large capacity, irreversibility is large in the charging and discharging process. As the crystalline carbon, graphite is typically used, and the theoretical limit capacity thereof is 372 mAh/g. Thus, graphite has a high capacity and is used as a negative-electrode active material.

However, even though the theoretical capacity of such graphite or carbon-based active material is relatively high, its theoretical capacity is only 380 mAh/g. Therefore, such graphite or carbon-based active material may not be used as a negative electrode active material in the development of a high capacity lithium battery in the future.

In order to overcome such problems, currently-studied active materials are metal-based or intermetallic compound-based negative-electrode active materials. For example, researches have been conducted in which metals or semi-metals such as aluminum, germanium, silicon, tin, zinc, lead and the like are used as negative-electrode active materials. These materials have high capacity and high energy density and may absorb and release more lithium ions than the negative-electrode active materials using carbon-based materials. Thus, they may be used to make batteries with high capacity and high energy density. For example, pure silicon is known to have a high theoretical capacity of 4017 mAh/g.

However, the metal-based or intermetallic compound-based negative-electrode active materials have lower cycle characteristics, compared with carbon-based materials. Thus they are not yet practical. This is due to the following reasons: When using pure silicon itself as a negative-electrode active material which is a lithium absorption and emissive material, conductivity between the active materials may deteriorate due to the volume change during charging and discharging, and the electrode active material may be peeled from the negative current collector. That is, the silicon contained in the negative-electrode active material absorbs lithium during charging and thus expands to about 300 to 400% of its original volume. When lithium is released, the inorganic particles thereof shrink.

Repeating such charge and discharge cycles may cause electrical insulation due to cracks in the negative-electrode active material, resulting in a drastic reduction in battery life.

Therefore, in order to solve such a problem, Korean Patent Application No. 10-2014-0165114 filed by the present applicant discloses a metallic negative active material having a significantly improved expansion ratio. In addition, Korean Patent Application No. 10-2015-0001837 filed by the present applicant discloses that amorphization of such metal-based negative active material is preferably in the range of 25% or more.

Thus, a negative electrode having improved performance may be manufactured by blending the metal-based material, especially the silicon-based negative active material, with the conventional graphite-based negative active material. In this connection, there is an increasing need to fabricate the negative electrode for secondary batteries using an alloy/graphite blend-based negative-electrode active material via the proper blending of the metal-based, in particular, silicon-based negative active materials and the graphite-based negative active materials.

SUMMARY

The present disclosure has been devised in view of the above problems. Therefore, the present disclosure is to provide a negative electrode for a lithium secondary battery having high negative electrode efficiency and excellent capacity retention, and a lithium secondary battery including the negative electrode.

Further, the present disclosure is to provide a negative electrode for a lithium secondary battery where high capacity retention may be maintained even when the secondary battery is charged and discharged, and a lithium secondary battery including the negative electrode.

Moreover, the present disclosure is to provide a negative electrode for a lithium secondary battery that exhibits excellent performance via an optimum mixing ratio between the silicon-based negative-electrode active material and the graphite-based negative-electrode active material, and a lithium secondary battery including the negative electrode.

In one aspect, there is provided a negative electrode for a lithium secondary battery, wherein the electrode contains 3 to 9% by weight of a silicon-based negative-electrode active material having a following composition formula (1); and 87.5 to 95.5% by weight of a graphite-based negative-electrode active material:

$$Si_xTi_yFe_zAl_u \qquad (1)$$

where x, y, z and u are atomic %, x: 1−(y+z+u), y: 0.09 to 0.14, z: 0.09 to 0.14, u: 0.01 exclusive to 0.2 exclusive.

In one embodiment of the negative electrode, the negative electrode further contains 0.5 to 1.5 wt % of a thickener and 1 to 2 wt % of a binder.

In one embodiment of the negative electrode, the negative electrode further contains 0.05 to 0.2% by weight of carbon nanotubes (CNT).

In one embodiment of the negative electrode, the negative electrode has a capacity retention equal to or greater than 90% after 50 charge/discharge cycles.

In one embodiment of the negative electrode, the negative electrode containing the carbon nanotubes (CNT) has a capacity retention equal to or greater than 95% after 50 charge/discharge cycles.

In one embodiment of the negative electrode, the silicon-based negative-electrode active material has an expansion of 70 to 150% after 50 charge/discharge cycles.

In one embodiment of the negative electrode, u is in a range of 0.05 to 0.19.

In one embodiment of the negative electrode, u is in a range of 0.10 to 0.19.

In one embodiment of the negative electrode, y is in a range of 0.09 to 0.125, and z is in a range of 0.09 to 0.125.

In one embodiment of the negative electrode, the thickener is CMC (carboxymethyl cellulose)-based thickener.

In one embodiment of the negative electrode, the binder is SBR (styrene-butadiene rubber)-based binder.

In one embodiment of the negative electrode, the silicon-based negative-electrode active material having the composition formula (1) has amorphization in a matrix-phase microcrystalline region, wherein the amorphization is in a range of 25% or more than 25%.

In another aspect, there is provided a lithium secondary battery comprising the above-defined negative electrode, a positive electrode, and electrolyte therebetween, wherein the negative electrode contains: 3 to 9% by weight of a silicon-based negative-electrode active material having the above composition formula (1); 87.5 to 95.5% by weight of a graphite-based negative-electrode active material; 0.5 to 1.5 wt % of a thickener; and 1 to 2 wt % of a binder.

In one embodiment of the battery, the negative electrode further contains 0.05 to 0.2% by weight of carbon nanotubes (CNT).

In one embodiment of the battery, the negative electrode has a capacity retention equal to or greater than 90% after 50 charge/discharge cycles.

In one embodiment of the battery, the negative electrode containing the carbon nanotubes (CNT) has a capacity retention equal to or greater than 95% after 50 charge/discharge cycles.

The advantageous effects of the present disclosure are as following. However, the present disclosure is not limited thereto. In accordance with the present disclosure, the negative electrode for a lithium secondary battery may have high negative electrode efficiency and excellent capacity retention.

Further, in accordance with the present disclosure, high capacity retention of the negative electrode may be maintained even when the secondary battery is charged and discharged.

Furthermore, in accordance with the present disclosure, via the intermixing between the silicon-based negative-electrode active material and the graphite-based negative-electrode active material, the negative electrode for a lithium secondary battery can exhibit excellent performance.

BRIEF DESCRIPTION OF THE DRAWINGS

FIG. 1A, FIG. 1B and FIG. 1C are tissue photographs showing expansion characteristics after 50 charge/discharge cycles for a silicon-based negative-electrode active material according to comparative examples.

FIG. 2 is a tissue photograph showing an expansion characteristic after 50 charge/discharge cycles for a silicon-based negative-electrode active material according to an embodiment of the present disclosure.

FIG. 3 is a graph showing negative electrode capacities, respectively, when the silicon-based negative-electrode active material according to the present disclosure is applied, and when the silicon-based negative-electrode active material according to the present disclosure is not applied.

FIG. 4 is a graph showing negative electrode capacities when the silicon-based negative-electrode active material according to the present disclosure is contained in an amount of 5.8 wt % and 9.6 wt %, respectively, and a negative electrode capacity when carbon nanotubes (CNT) are added to the silicon-based negative-electrode active material and the graphite-based negative-electrode active material.

FIG. 5 illustrates amorphization measurements of the silicon-based negative-electrode active material according to an embodiment of the present disclosure.

DETAILED DESCRIPTIONS

In one aspect of the present disclosure, there is provided a negative electrode for a lithium secondary battery, wherein the electrode contains 3 to 9% by weight of a silicon-based negative-electrode active material having a following composition formula (1); and 87.5 to 95.5% by weight of a graphite-based negative-electrode active material:

$$Si_xTi_yFe_zAl_u \qquad (1)$$

where x, y, z and u are atomic %, x: 1−(y+z+u), y: 0.09 to 0.14, z: 0.09 to 0.14, u: 0.01 exclusive to 0.2 exclusive.

The thickener is an essential component of the negative electrode for the battery. However, as the weight percent of the thickener in the electrode increases, contents of the silicon-based negative-electrode active material and the graphite-based negative-electrode active material relatively decrease in the electrode. This may lead to a reduction in the performance of the secondary battery. Therefore, according to the present disclosure, the weight % upper limit of the thickener in the negative electrode for a lithium secondary battery is limited to 1 wt %. However, the present disclosure is not limited thereto. Depending on the type and performance of the thickener, or depending on the silicon-based negative-electrode active material, the graphite-based negative-electrode active material, and the binder, the thickener may be added in varying quantities.

The thickener may also embodied as a CMC (carboxymethyl cellulose)-based thickener. The present disclosure is not necessarily limited to this.

The binder is preferably in the range of 1 to 2% by weight in the negative electrode. The binder increases binding between the components of the negative electrode for lithium secondary batteries, thus preventing cracking in the negative electrode and increasing structural stability thereof. Therefore, when the binder is used in an amount of less than 1% by weight, the structural stability of the negative electrode for a lithium secondary battery decreases, thereby negatively affecting secondary battery performance.

Likewise, the binder is an essential component of the negative electrode for the battery. However, as the weight percent of the binder in the electrode increases, contents of the silicon-based negative-electrode active material and the graphite-based negative-electrode active material relatively decrease in the electrode. This may lead to a reduction in the performance of the secondary battery. Therefore, according to the present disclosure, the weight % upper limit of the binder in the negative electrode for a lithium secondary battery is limited to 2 wt %. However, the present disclosure is not limited thereto. Depending on the type and performance of the binder, or depending on the silicon-based negative-electrode active material, the graphite-based negative-electrode active material, and the thickener, the binder may be added in varying quantities.

The binder may also be embodied as a styrene-butadiene rubber (SBR)-based binder. However, the present disclosure is not limited to this.

The graphite-based negative-electrode active material contained in the lithium secondary battery plays a role in absorption and release of lithium ions. The content of the graphite-based negative-electrode active material is not particularly limited, and, hence, may be varied depending on the contents of the silicon-based negative-electrode active material, the thickener and the binder.

[Blending Between Silicon-based Negative-electrode Active Material and Graphite-based Negative-electrode Active Material 에 Carbon Nanotubes]

The negative electrode for a lithium secondary battery may further include carbon nanotubes (CNTs). Carbon nanotubes (CNTs) prevent active material from escaping during expansion and contraction of the negative electrode in charging and discharging operations thereof. In one embodiment, the content of the carbon nanotubes (CNT) may have a range of 0.05 to 0.2 wt % in the negative electrode. When the carbon nanotubes (CNT) are contained in an amount less than 0.05 wt %, the effect of preventing the active material from escaping is insignificant. To the contrary, when the carbon nanotubes (CNT) are contained in an amount exceeding 0.2 wt %, the effect of preventing the active material from escaping does not increase in proportion to the content of the carbon nanotubes (CNT) added thereto. Thus, effect versus cost may be lowered.

Hereinafter, the present disclosure will be described in more detail by way of examples.

(Evaluation 1): Properties of the Silicon-based Negative-electrode Active Material Used in the Present Examples Within the silicon-based negative-electrode active material used in the present example 1, Si is included in the range of 60 to 70% at atomic % (at %), and each of Ti and Fe is included in the range of 9 to 14 atomic %. On the other hand, Al has an atomic percentage in the range of more than 1 at % and less than 20 at %, preferably in the range of 5 to 19 at %, and most preferably in the range of 10 to 19 at %.

Table 1 below shows composition ranges of respective components in the present examples and comparison examples. On the other hand, Table 2 below shows evaluation results of silicon-based negative-electrode active materials based on the composition ranges of Table 1 above. In particular, Table 2 indicates 1CY-charging/discharging amounts, 1CY-efficiency, 1CY-negative electrode capacity, 50CY-discharging capacity, 50CY-efficiency, 50CY-capacity retention, 50CY-expansion, and amorphization (%) in the present examples and comparison examples. The technical meaning of each item in Table 2 will be described in detail below.

The silicon-based negative-electrode active materials used in the present examples were evaluated under 50 charge/discharge cycles of charge and discharge thereof. In this regard, the charge-discharge scheme follows a charge-discharge scheme for an active material for a lithium secondary battery, which is generally known in the art.

First, in the case of the present example 1 to the present example 5, Al is contained in the range of 5 to 19 atomic %. In comparison example 1, Al is not added. In comparison example 2, Al was added at 1 at %. In comparison example 3, Al was added at 20 at %.

On the other hand, Ti and Fe are coupled to Si to form an intermetallic compound $Si_2TiFe$. Therefore, when contents of Ti and Fe are high, and they are consumed to form the intermetallic compound with Si, a capacity per gram (g) of the active material is reduced. In this connection, in order to obtain a capacity of 1000 mAh/g or more, a content of Si should be very high. In general, when a large amount of semi-metallic Si is contained, a viscosity of a molten metal of the active material is high during melting, and, thus, a rapid cooling and solidifying workability of the active material tends to deteriorate. Therefore, it is preferable to keep the Si content within the range of 70 at % or less.

Therefore, it is preferable that each of contents of Ti and Fe does not exceed 14 at % in consideration of the fact that they form the intermetallic compound with Si as described above.

Referring to the following Tables 1 and 2, it was found that each content of Ti and Fe was preferably in a range of 14 at % or less in the course of deriving optimum alloy component compositions in terms of expansion of the active material.

Further, in one embodiment, Al content has a range of greater than 1 at % and less than 20 at %. When Al is included at 1 at %, expansion will occur greatly after 50 charge/discharge cycles. In this case, the active material may be undesirably scattered. In addition, when Al content is 20 atomic %, the discharging capacity due to Si:matrix volume fraction change sharply decreases. In the present examples, the present applicants have found that the active material may have the most desirable range of expansion when Al content has a range of 5 to 19 at %. Moreover, within this range, it was found that the discharging capacity did not decrease. Most preferably, Al content is a range of 10 to 19 at %. In this range, the most favorable range of expansion after 50 charge/discharge cycles is obtained, and no reduction in discharging capacity occurs.

Referring to Table 2, it is confirmed that, in the present example 1 to the present example 5, the performance of the active material is improved by adding Al. Particularly, it can be seen that the addition of Al significantly improves the discharging capacity, the reversibility efficiency, and the expansion property. On the other hand, in the case of the comparison example 1 in which Al is not added, the expansion after 50 charge/discharge cycles shows a value exceeding 200%. Also, in the case of the comparison example 2 where Al is added at 1 at %, similarly, the expansion after 50 charge/discharge cycles shows a value exceeding 200%. On the other hand, in the comparison example 3 with 20 at % Al added, the expansion after 50 charge/discharge cycles is very low to be 40.2%, but discharging capacity is significantly reduced. In this case, the performance of the negative-electrode active material for the secondary battery is lowered.

Therefore, referring to Tables 1 and 2, it can be seen that the addition of Al to the negative-electrode active material significantly improves discharging capacity, reversibility efficiency, and expansion characteristics. In this connection, it can be seen that the addition amount of Al exceeding 1 at %, but less than 20 at % shows optimum performance of the active material. In the comparison examples 1 and 2, amorphization (%) is less than 25%. Conversely, in the present examples, it can be seen that within the above-defined Al compositional range, the amorphization preferably is at least 25%.

FIGS. 1A, 1B, 1C and 2 are tissue photographs showing expansion characteristics after 50 charge/discharge cycles for the comparison example 2 and the present example 5, respectively. In FIGS. 1A, 1B, and 1C, regions defining bright color particles are matrix regions, and background regions with the dark colors are Si regions. Prior to the life test, the matrix was in a well-cohered state initially, as can be seen in FIG. 1C. However, after 50 charge/discharge cycles, the volume of the Si region increases and the brightly colored particles region forming the matrix is in scattered or non-cohered state. In the case of FIG. 1C, even after 50 charge/discharge cycles, the matrix is in a cohered state without any scattering, regardless of the contraction or expansion of the silicon. The scattering of the active material matrix has resulted in a rapid increase in the expansion after 50 charge/discharge cycles. As in the comparison examples 1 and 2 where Al is added at 1 at % or less, the expansion after 50 charge/discharge cycles is very large, that is, is more than 200%. On the other hand, in the case of the present example 5 where no scattering of the active material is observed, the expansion after 50 charge/discharge cycles is about 78%, which leads to has excellent expansion and life characteristics.

TABLE 1

| Examples | Si (at %) | Ti (at %) | Fe (at %) | Al (at %) |
|---|---|---|---|---|
| Comparison example 1 | 70 | 15 | 15 | 0 |
| Comparison example 2 | 70 | 14.5 | 14.5 | 1 |
| The present example 1 | 70 | 12.5 | 12.5 | 5 |
| The present example 2 | 70 | 11.5 | 11.5 | 7 |
| The present example 3 | 70 | 10 | 10 | 10 |
| The present example 4 | 68 | 9 | 9 | 14 |
| The present example 5 | 65 | 10 | 10 | 15 |
| Comparison example 3 | 60 | 10 | 10 | 20 |

Charging: 0.5 C, 0.01 V, 0.05 C cut-off
Discharge: 0.5 C, 1.0V cut-off

In the above Table 2, the 1CY-charge (mAh/g) refers to a formation charge capacity per one gram (g) of the active material. This value is obtained as follows: an amount of charge in a first charging step of the formation process after the coin cell is assembled is measured, and, then, the measurement is divided by a weight of the active material contained in the negative electrode of the coin cell. The division result is the 1CY-charge value.

In the above Table 2, the 1CY-discharge (mAh/g) refers to a formation discharge capacity per one gram (g) of the active material. This value is obtained as follows: an amount of charge in a first discharging step of the formation process after the coin cell is assembled is measured, and, then, the measurement is divided by a weight of the active material contained in the negative electrode of the coin cell. The division result is the 1CY-discharge value. In the present examples, the discharge capacity per one gram means 0.1 C formation discharge capacity.

In the above Table 2, the 1CY-efficiency refers to a percent representation of the measured discharge capacity divided by the measured charge capacity in the first formation charge-discharge process. In general, graphite has a high initial efficiency of 94%, silicon alloys have an initial

TABLE 2

| Examples | 1CY-charge | 1CY-discharge | 1CY-efficiency | 1CY-negative electrode | 50CY-discharge | 50CY-efficiency | 50CY-retention | 50CY-expansion | Amorphization (%) |
|---|---|---|---|---|---|---|---|---|---|
| Comparison example 1 | 1134.0 | 924.2 | 81.5% | 800.4 | 871.2 | 98.4% | 101.6% | 210.0% | 24.5 |
| Comparison example 2 | 1277.2 | 1072.3 | 83.9% | 928.6 | 1012.1 | 98.8% | 96.1% | 208.3% | 24.7 |
| The present example 1 | 1299.9 | 1085.2 | 83.5% | 939.8 | 948.7 | 99.1% | 91.8% | 147.9% | 29.2 |
| The present example 2 | 1405.6 | 1212.5 | 86.3% | 1050.0 | 1125.1 | 99.5% | 97.1% | 96.2% | 41.1 |
| The present example 3 | 1336.5 | 1133.2 | 84.7% | 981.3 | 1038.7 | 99.3% | 97.2% | 120.0% | 45.5 |
| The present example 4 | 1752.3 | 1535.8 | 87.6% | 1330.0 | 1216.5 | 99.3% | 88.7% | 93.8% | 35.1 |
| The present example 5 | 1189.4 | 988.0 | 83.0% | 855.6 | 977.2 | 100.5% | 113.2% | 78.1% | 45.3 |
| comparison example 3 | 614.2 | 432.8 | 70.3% | 374.8 | 597.7 | 100.5% | 164.1% | 40.2% | 46.5 |

First, the evaluation of the silicon-based negative-electrode active materials used in the present examples was performed using a negative electrode of the following composition.

Specifically, silicon-based alloy active material; conductive additive (carbon black):binder (organic PAI binder) were mixed at 86.6 wt %:3.4 wt %:10 wt %. The mixture was dispersed in an NMP solvent to prepare a slurry. This slurry was coated on the copper foil collector by a doctor blade method. This coating was then dried in an oven at 110 degrees Celsius and then heat-treated at 210 degrees Celsius for one hour under an Ar atmosphere. Thus, the binder was cured and the negative electrode was prepared.

The negative electrode thus obtained is paired with a counter electrode made of a lithium metal to form a coin cell. Subsequently, the coin cell was subjected to a formation process under the following conditions.

Charging (lithium insertion): 0.1 C, 0.005V, 0.05 C cut-off
Discharge (Lithium emission): 0.1 C, 1.5V cut-off After the formation process, the cycle test was performed under the following conditions.

efficiency of 80 to 90%, and silicon oxide (SiOx) has an initial efficiency value of up to 70%.

All types of materials have an initial efficiency of less than 100%. The reason for this is that during the charging of the formation process, initially contained lithium is irreversibly trapped, or lithium is consumed due to a side reaction such as SEI formation. When the initial efficiency is low, the battery should contain an additional negative-electrode active material and an additional positive-electrode active material. Therefore, high initial efficiency is important in battery design.

The silicon-based alloys used in the present examples have an initial efficiency of about 85%. The conductive additive and binder also initially irreversibly consume lithium. Therefore, the initial efficiency value of the actual active material itself is about 90%.

In the above Table 2, the 50CY-discharge refers to a discharging capacity per one g of the active material in the 50th charge/discharge cycle. After the formation process, a further formation process is included during the cycle test at 0.5 C. The 50CY-discharge may be a value obtained by dividing an amount of charge measured at the time of discharge in the 50th cycle by the weight of the active material. When the active material deteriorates during the cycle test, the discharging capacity is measured at a lower value than the initial discharging capacity, while, when there is little or no deterioration, the discharging capacity is measured to have a value similar to the initial discharging capacity.

In the above Table 2, the 50CY-efficiency is a representation of a ratio of the charge amount to the discharge amount, as measured at the both charge/discharge cycle. The higher the 50CY-efficiency, the less the lithium loss due to side reaction and other deterioration in the cycle. Generally, when the 50CY-efficiency is 99.5% or more, it is considered to be a very good value. Under a laboratory environment, deviations in the coin cell assembly may not be neglected. In this case, when the 50CY-efficiency is 98% or more, it is considered to be a good value.

The 50CY-retention refers to a percentage representation of a ratio of the discharging capacity in the both cycle relative to the discharge capacity of the first cycle during subsequent 0.5 C cycles, except for the cycles preformed in the formation process.

The higher the 50CY-retention is, the closer the battery life slope is to a horizontal line. When the 50CY-retention is 90% or less, it means that the discharge capacity is decreased due to deterioration during the cycle progress. In some of the present examples, the 50CY-retention may exceed 100%. This means that substantially no deterioration occurs during the life of the battery, and at the same time, additionally-activated silicon particles are appearing.

The 50CY-expansion refers to a percentage representation of a ratio of an increased thickness after 50 charge/discharge cycles relative to an initial thickness of the negative electrode. The measurement method of 50CY-expansion will be described in detail as follows.

First, an initial thickness of a current collector is measured, and thicknesses of the counter electrode and electrolyte layer are measured.

Thereafter, the current collector is attached to the negative electrode, which, in turn, is cut into a circular shape. Then, the negative electrode together with the collector is assembled with the counter electrode and electrolyte layer to form a coin cell. In this connection, the thickness of the assembly is measured using a micrometer. Subsequently, by subtracting the thickness of the current collector, and the thicknesses of the counter electrode and electrolyte layer from the measured thickness of the assembly, the thickness of the electrode active material only is calculated.

Subsequently, after completion of the 50 cycles test, the coin cell is disassembled in the dry room to separate only the negative plate and the current collector from the coin cell. The remaining electrolyte is cleaned from the separated structure using a DEC solution. Thereafter, the structure is dried, and then the thickness of the structure is measured using a micrometer. The thickness of the current collector is subtracted from the measured thickness such that the thickness of the negative electrode active material after the above 50 cycles is calculated. That is, the ratio of the increased active material thickness after the 50 cycles relative to the initial active material thickness is expressed as a percentage, which is the 50CY-expansion value.

(Evaluation 2): Blends Between the Silicon-based Negative-electrode Active Material, the Graphite-based Negative-electrode Active Material and/or Carbon Nanotubes (CNT) and Properties of the Blends Tables 3 to 5 below show performances of negative electrodes obtained by blending the silicon-based negative-electrode active material having the above composition formula (i) with the graphite-based negative-electrode active material. Specifically, the performances are quantified using the active material capacity, the negative electrode capacity, efficiency, 1CY expansion, 50CY expansion, and capacity retention in the present examples and comparison examples. In Table 3, the silicon-based negative-electrode active material has an atomic percent content of each component according to the composition formula (i) with the presence of Al, while a comparison metal-based negative-electrode active material is composed of Si, Ti, and Fe without Al.

Tables 3 to 5 below further show cell performances when carbon nanotubes (CNT) are added to the silicon-based negative-electrode active material having the composition formula (1). The performances are quantified using the active material capacity, the negative electrode capacity, efficiency, 1CY expansion, 50CY expansion, and capacity retention in the present examples and comparison examples.

Specifically, in the present example 6, the silicon-based negative-electrode active material is contained in the range of 3 to 9 wt %. In comparison example 4, the comparison metal-based negative-electrode active material has the same weight percentage as the present example 6 and the negative active material, and, the weight percentage of each of the graphite-based negative-electrode active material, binder and thickener and CNT are the same as those in the present example 6. In comparison example 5, the content of the silicon-based negative-electrode active material exceeds 9% by weight.

Also, in the present example 7, the silicon-based negative-electrode active material is included in the range of 3 to 9 wt %, but carbon nanotubes (CNT) are further added thereto.

Each of contents of the thickener and binder is the same for all of the present example 6, the present example 7, the comparison example 4, and the comparison example 5. That is, the contents of the thickener and binder are 1 wt % and 2 wt % respectively. By excluding a sum of the weight percentages of the silicon-based negative-electrode active material, thickener, binder and carbon nanotubes (CNT), the weight percent of the graphite-based negative-electrode active material is calculated.

TABLE 3

| Negative active material | Si (at %) | Ti (at %) | Fe (at %) | Al (at %) |
| --- | --- | --- | --- | --- |
| Present silicon-based negative-electrode active material | 70 | 11.5 | 11.5 | 7 |
| Comparison metal-based negative-electrode active material | 70 | 15 | 15 | 0 |

TABLE 4

| Examples | Negative-electrode active material | Graphite-based negative-electrode active material | Thickener | Binder | CNT |
|---|---|---|---|---|---|
| Comparison example 4 | Comparison metal-based negative-electrode active material 5.8% | 91.2% | 1% | 2% | 0% |
| The present example 6 | Silicon-based negative-electrode active material 5.8% | 91.2% | 1% | 2% | 0% |
| Comparison example 5 | Silicon-based negative-electrode active material 9.6% | 87.4% | 1% | 2% | 0% |
| The present example 7 | Silicon-based negative-electrode active material 5.8% | 91.1% | 1% | 2% | 0.1% |

TABLE 5

| Examples | Active material capacity | Negative electrode capacity | Efficiency | Expansion (1CY) | Capacity retention (50CY) |
|---|---|---|---|---|---|
| Comparison example 4 | 375.4 mAh/g | 364.1 mAh/g | 88.4% | 42.9% | 82.8% |
| The present example 6 | 387.0 mAh/g | 375.4 mAh/g | 88.5% | 41.9% | 90.2% |
| Comparison example 5 | 400.9 mAh/g | 388.8 mAh/g | 82.7% | 64% | — |
| The present example 7 | 398.7 mAh/g | 386.5 mAh/g | 89.4% | 53.0% | 95.4% |

Referring to Tables 3 to 5 and FIG. 3, the performance of the secondary battery resulting from the blending between the silicon-based negative-electrode active material and the graphite-based negative-electrode active material according to the present disclosure is confirmed. FIG. 3 is a graph showing negative electrode capacities for a secondary battery when the silicon-based negative-electrode active material is contained and the comparison metal-based negative-electrode active material is contained. In the graph of FIG. 3, AlSA represents the negative electrode capacity of the present example 6 containing the silicon-based negative-electrode active material, while 70*v*1 indicates the negative electrode capacity of the comparison example 4 including the comparison metal-based negative-electrode active material.

Referring to the graph of FIG. 3, it was confirmed that the negative electrode capacity was increased by using the silicon-based negative-electrode active material in manufacturing the negative electrode for a secondary battery. Also, referring to Table 5, it can be seen that the capacity retention after 50 charge/discharge cycles increased from 82.8% to 90.2% when the silicon-based negative-electrode active material was used. On the other hand, in the case of comparison example 4 using the comparison metal-based negative-electrode active material, it can be seen that all of the performances such as the active material capacity, the negative electrode capacity, efficiency, and expansion were lowered.

Further, in comparison example 5, which contains 9.6 wt % of the silicon-based negative-electrode active material, the expansion after 50 charge/discharge cycles was significantly increased, resulting in a reduction in cell efficiency. In FIG. 4, 420-Ref represents the negative electrode capacity of comparison example 2 containing 9.6 wt % of the silicon-based negative-electrode active material. In this connection, it can be seen that as the charge/discharge cycles progress, the negative electrode capacity drops significantly. This is due to the following reason: when the silicon-based negative-electrode active material is contained in an amount exceeding 9 wt %, cracking in the active material occurs due to the difference in the expansion rate between the silicon-based negative-electrode active material and the graphite-based negative-electrode active material. Thus, although the initial negative electrode capacity increases, capacity retention and expansion of the negative active material, and, thus, the performance of the secondary battery deteriorate.

Thus, in the present examples, the silicon-based negative-electrode active material containing Al is contained in an amount of 3 to 9% by weight, whereby the active material capacity, the negative electrode capacity, efficiency, and 1CY expansion may be improved.

Referring to Tables 3 to 5 and FIG. 4, the effect of carbon nanotubes (CNT) when the carbon nanotubes (CNT) is added to the silicon-based negative-electrode active material according to the present disclosure may be confirmed. FIG. 4 shows the negative electrode capacity when the silicon-based negative-electrode active material according to the present disclosure is included at 5.8 wt %, and the negative electrode capacity when the carbon nanotubes (CNT) is further added thereto. In the graph of FIG. 4, 400-Ref represents the negative electrode capacity of the present example 6 containing the silicon-based negative-electrode active material, while 400-CNT indicates the negative electrode capacity of the present example 7 containing the carbon nanotubes (CNT) added to the silicon-based negative-electrode active material. The present example 7 with the addition of the carbon nanotubes (CNT) shows better performance than the present example 6 containing only the silicon-based negative-electrode active material.

The carbon nanotubes (CNTs) prevent the active material from escaping during expansion-contraction of the negative electrode in charging and discharging thereof. As a result, the CNT plays a role in improving the capacity retention of the battery. In one embodiment, upon comparing between the present example 7 in which the silicon-based negative-electrode active material and the graphite-based negative-electrode active material have the carbon nanotubes (CNTs) added thereto, and the present example 6 where the carbon nanotubes (CNTs) are absent, the capacity retention after 50 charge/discharge cycles was increased from 90.2% (example 6) to 95.4% (example 7).

In one embodiment, the content of the carbon nanotubes (CNT) may have a range of 0.05 to 0.2 wt % in the negative electrode. When the carbon nanotubes (CNT) are contained in an amount less than 0.05 wt %, the effect of preventing the active material from escaping is insignificant. To the contrary, when the carbon nanotubes (CNT) are contained in an amount exceeding 0.2 wt %, the effect of preventing the active material from escaping does not increase in proportion to the content of the carbon nanotubes (CNT) added thereto. Thus, effect versus cost may be lowered.

In addition, all of the present example 6, the present example 7, the comparison example 4, and the comparison example 5 contain CMC (carboxymethyl cellulose)-based thickener and the content thereof is 1 wt %. However, the present disclosure is not limited thereto. Depending on the type and performance of the thickener, or the silicon-based negative-electrode active material, the graphite-based negative-electrode active material, and the binder, the weight percent of the thickener may vary.

In addition, all of the present example 6, the present example 7, the comparison example 4, and the comparison example 5 contain SBR (styrene-butadiene rubber)-based binder and its content is 2 wt %. However, the present disclosure is not limited thereto. Depending on the type and performance of the binder, or the silicon-based negative-electrode active material, the graphite-based negative-electrode active material, and the thickener, the weight percent of the binder may vary.

It will be understood by those skilled in the art that the present disclosure may be embodied in other specific forms without departing from the spirit or essential characteristics thereof. Therefore, it should be understood that the present embodiments described above are exemplary in all aspects and not restrictive. The scope of the present disclosure is defined by the appended claims rather than the above detailed description. All changes, modifications, and alternatives resulting from the spirit and scope of the claims, and equivalents thereof, are to be construed as being included within the scope of the present disclosure.

What is claimed is:

1. A negative electrode for a lithium secondary battery, wherein the electrode contains:
    3 to 9% by weight of a silicon-based negative-electrode active material having a following composition formula (1);
    87.5 to 95.5% by weight of a graphite-based negative-electrode active material; and
    0.05 to 0.2% by weight of carbon nanotubes (CNT),
    wherein the silicon-based negative-electrode active material having the composition formula (1) has amorphization in a matrix-phase microcrystalline region, wherein the amorphization is in a range of 25% or more and the composition formula (1) is expressed as:

$$Si_xTi_yFe_zAl_u \quad (1)$$

where x, y, z and u are atomic %, x: 1−(y+z+u), y: 0.09 to 0.14, z: 0.09 to 0.14, u: 0.01 exclusive to 0.2 exclusive.

2. The negative electrode of claim 1, further containing 0.5 to 1.5 wt % of a thickener and 1 to 2 wt % of a binder.

3. The negative electrode of claim 1, wherein the negative electrode has a capacity retention equal to or greater than 90% after 50 charge/discharge cycles.

4. The negative electrode of claim 1, wherein the negative electrode containing the carbon nanotubes (CNT) has a capacity retention equal to or greater than 95% after 50 charge/discharge cycles.

5. The negative electrode of claim 1, wherein the silicon-based negative-electrode active material has an expansion of 70 to 150% after 50 charge/discharge cycles.

6. The negative electrode of claim 5, wherein u is in a range of 0.05 to 0.19.

7. The negative electrode of claim 6, wherein u is in a range of 0.10 to 0.19.

8. The negative electrode of claim 5, wherein y is in a range of 0.09 to 0.125, and z is in a range of 0.09 to 0.125.

9. The negative electrode of claim 2, wherein the thickener is CMC (carboxymethyl cellulose)-based thickener.

10. The negative electrode of claim 2, wherein the binder is SBR (styrene-butadiene rubber)-based binder.

11. A lithium secondary battery comprising:
    a negative electrode, wherein the negative electrode contains:
    3 to 9% by weight of a silicon-based negative-electrode active material having a following composition formula (1);
    87.5 to 95.5% by weight of a graphite-based negative-electrode active material;
    0.5 to 1.5 wt % of a thickener;
    1 to 2 wt % of a binder; and
    0.05 to 0.2% by weight of carbon nanotubes (CNT),
    wherein the silicon-based negative-electrode active material having the composition formula (1) has amorphization in a matrix-phase microcrystalline region, wherein the amorphization is in a range of 25% or more and the composition formula (1) is expressed as:

$$Si_xTi_yFe_zAl_u \quad (1)$$

where x, y, z and u are atomic %, x: 1−(y+z+u), y: 0.09 to 0.14, z: 0.09 to 0.14, u: 0.01 exclusive to 0.2 exclusive.

12. The battery of claim 11, wherein the negative electrode has a capacity retention equal to or greater than 90% after 50 charge/discharge cycles.

13. The battery of claim 11, wherein the negative electrode containing the carbon nanotubes (CNT) has a capacity retention equal to or greater than 95% after 50 charge/discharge cycles.

* * * * *